United States Patent
Inoue et al.

(10) Patent No.: US 8,877,106 B2
(45) Date of Patent: Nov. 4, 2014

(54) DEVICE FOR FORMING THERMOSETTING RESIN FOAM PLATE AND METHOD OF MANUFACTURING THERMOSETTING RESIN FOAM PLATE

(75) Inventors: Yoshimitsu Inoue, Tokyo (JP); Tadashi Ishio, Tokyo (JP)

(73) Assignee: Asahi Kasei Construction Materials Corporation, Tokyo (JP)

(*) Notice: Subject to any disclaimer, the term of this patent is extended or adjusted under 35 U.S.C. 154(b) by 0 days.

(21) Appl. No.: 13/266,483

(22) PCT Filed: Apr. 27, 2010

(86) PCT No.: PCT/JP2010/057421
§ 371 (c)(1),
(2), (4) Date: Oct. 27, 2011

(87) PCT Pub. No.: WO2010/126024
PCT Pub. Date: Nov. 4, 2010

(65) Prior Publication Data

US 2012/0043681 A1    Feb. 23, 2012

(30) Foreign Application Priority Data

Apr. 28, 2009 (JP) ............... P2009-109424

(51) Int. Cl.
| B29C 44/30 | (2006.01) |
| B29C 44/58 | (2006.01) |
| B29C 39/14 | (2006.01) |
| D06N 3/00 | (2006.01) |
| B29C 44/56 | (2006.01) |
| B29C 39/16 | (2006.01) |
| B29C 39/18 | (2006.01) |
| B29K 105/04 | (2006.01) |

(52) U.S. Cl.
CPC ............ B29C 39/148 (2013.01); B29C 44/588 (2013.01); B29C 44/30 (2013.01); D06N 3/0077 (2013.01); D06N 3/005 (2013.01); B29C 44/5609 (2013.01); B29C 39/16 (2013.01); B29K 2105/04 (2013.01); B29C 39/18 (2013.01)
USPC .......... 264/46.2; 264/45.5; 264/45.8; 264/51; 264/54; 425/363; 425/371; 100/151

(58) Field of Classification Search
CPC .......................... B29C 44/588; B29C 44/5609
USPC ........... 264/45.5, 45.8, 46.2, 51, 54; 425/363, 425/371; 100/151
See application file for complete search history.

(56) References Cited

U.S. PATENT DOCUMENTS

| 3,888,608 A | 6/1975 | Holl |
| 3,895,086 A * | 7/1975 | Berner .................. 264/45.4 |

(Continued)

FOREIGN PATENT DOCUMENTS

| EP | 1 056 580 B1 | 6/2003 |
| JP | 57-61534 A | 4/1982 |

(Continued)

OTHER PUBLICATIONS

Office Action for corresponding Russian Patent Application No. 2011143519, dated Nov. 28, 2012.

(Continued)

*Primary Examiner* — Robert B Davis
*Assistant Examiner* — Lawrence D Hohenbrink, Jr.
(74) *Attorney, Agent, or Firm* — Birch, Stewart, Kolasch & Birch, LLP

(57) ABSTRACT

There are provided a forming device capable of drying at a high speed and of manufacturing a thermosetting resin foam plate more efficiently and stably without multilayering any unnecessary surface material, and a method of efficiently manufacturing a thermosetting resin foam plate therefor. A thermosetting resin foam plate is manufactured by: mixing a resin composition containing at least a thermosetting resin, a foaming agent and a curing agent in a mixer; continuously discharging the resin composition on a traveling air-permeable and flexible surface material, and at the same time covering the upper surface of the resin composition with an air-permeable and flexible surface material; and passing the covered resin composition through a forming device equipped with conveyors having apertures having an aperture area ratio of 15% or more and 80% or less to form and cure the resin composition.

8 Claims, 7 Drawing Sheets

(56) References Cited

U.S. PATENT DOCUMENTS

| | | |
|---|---|---|
| 3,986,918 A | 10/1976 | Berner |
| 3,999,230 A * | 12/1976 | Bruning et al. ............... 425/149 |
| 4,087,501 A | 5/1978 | Moser |
| 5,149,394 A * | 9/1992 | Held ............................ 156/555 |
| 5,171,756 A | 12/1992 | Ricciardi et al. |
| 5,968,430 A | 10/1999 | Naito et al. |
| 6,355,701 B1 | 3/2002 | Soukup et al. |
| 2007/0251659 A1* | 11/2007 | Fernandes et al. ............ 162/205 |
| 2010/0159199 A1* | 6/2010 | Cretti ............................ 428/141 |

FOREIGN PATENT DOCUMENTS

| | | |
|---|---|---|
| JP | 58-112737 A | 7/1983 |
| JP | 3-5973 B2 | 1/1991 |
| JP | 5-269722 A | 10/1993 |
| JP | 5-309756 A | 11/1993 |
| JP | 2561575 B2 | 12/1996 |
| JP | 2561576 B2 | 12/1996 |
| JP | 9-277278 A | 10/1997 |
| JP | 49-133484 A | 12/1997 |
| JP | 2002-240073 A | 8/2002 |
| JP | 2002-292651 A | 10/2002 |
| JP | 2005-131820 A | 5/2005 |
| KR | 1994-0007523 B1 | 8/1994 |
| KR | 1996-0009114 B1 | 7/1996 |
| RU | 2 189 311 C2 | 11/1998 |
| SU | 865121 A3 | 9/1981 |
| TW | 401345 B | 8/2000 |
| WO | WO 2009/001213 A2 | 12/2008 |

OTHER PUBLICATIONS

Office Action for corresponding Korean Patent Application No. 10-2011-7013111, dated Feb. 27, 2013.
Taiwanese Office Action for Application No. 099113554 dated Jul. 24, 2012.
International Search Report dated Jul. 20, 2010, for Application No. PCT/JP2010/057421.
International Preliminary Report on Patentability and English Translation of Written Opinion of the International Searching Authority, dated Nov. 17, 2011, for International Application No. PCT/JP2010/057421 (Forms PCT/IB/338, PCT/IB/373 and PCT/ISA/237).
European Search Report for corresponding European Patent Application No. 10769722.9, dated Jun. 20, 2013.
The Notice of Allowance, dated Sep. 5, 2013, issued in the corresponding Korean Patent Application No. 10-2011-7013111.

* cited by examiner

Fig.5
(a)
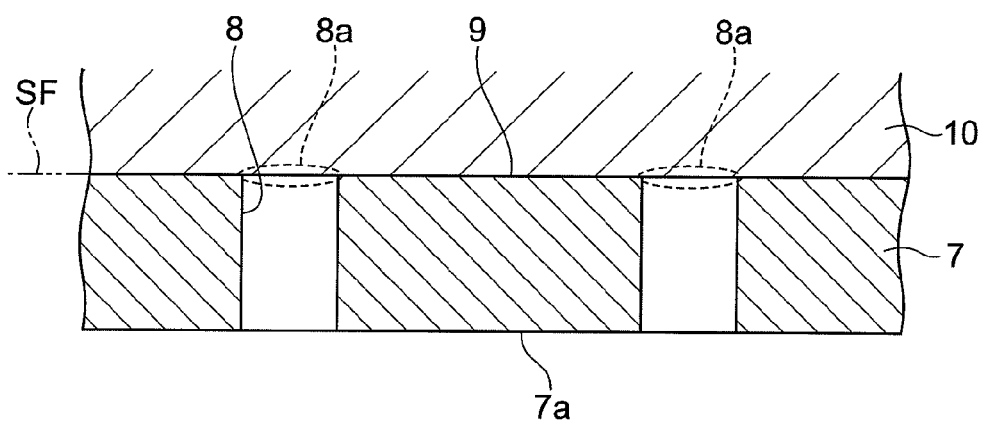
(b)
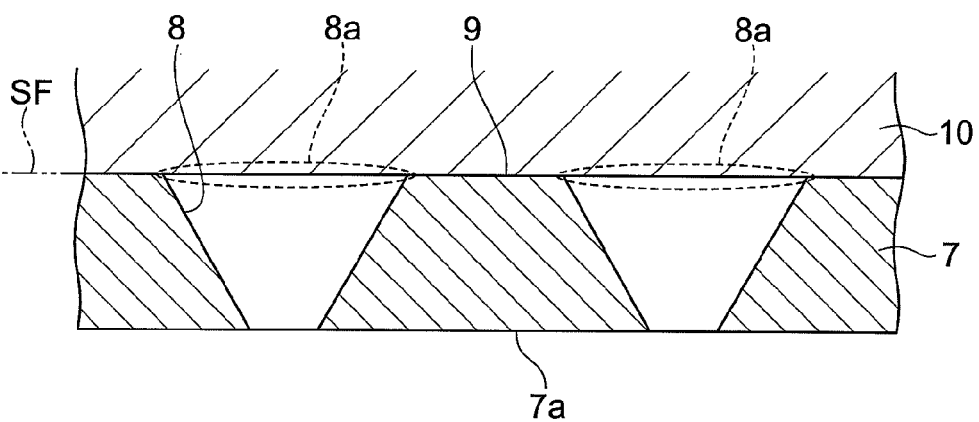

DEVICE FOR FORMING THERMOSETTING RESIN FOAM PLATE AND METHOD OF MANUFACTURING THERMOSETTING RESIN FOAM PLATE

TECHNICAL FIELD

The present invention relates to a device for forming a thermosetting resin foam plate, and a method of manufacturing a thermosetting resin foam plate.

BACKGROUND ART

As a method of manufacturing a thermosetting resin foam plate, a method is known in which after a resin composition composed of a thermosetting resin, a foaming agent, a catalyst and the like is kneaded by a mixer, and thermosetting resin kneaded material is discharged on a surface material traveling at a constant speed, the thermosetting resin foam plate is formed between a double conveyor in a curing oven, but for example, in the case of manufacturing a phenolic resin foam plate, it is important that a thermosetting resin foam plate is dried and formed by speedily and efficiently dissipating moisture generated inside the foam due to the curing reaction of the resin composition during foaming and curing.

As a typical example of utilizing a double conveyor as a forming device of a thermosetting resin foam plate in which device the thermosetting foam plate is dried and formed, as described in Patent Literature 1, a forming device is proposed in which a zone is installed in which a foam plate is exposed and dried in a curing oven by arranging tandemly a plurality of double conveyors and installing conveyors at predetermined intervals.

As described in Patent Literature 2, a forming device is proposed in which a section where a foam plate is exposed without contacting with any metal surface is arranged after a forming oven, including a method in which a drying-dedicated oven having no double conveyor is disposed behind a double conveyor-type forming device.

On the other hand, as a manufacturing method of efficiently drying and forming a thermosetting foam plate, Patent Literature 3 proposes a manufacturing method in which an air-permeable sheet having a moisture-permeation function is further adhered between a thermosetting resin composition and a surface material.

CITATION LIST

Patent Literature

Patent Literature 1: Japanese Patent No. 2561575
Patent Literature 2: Japanese Patent No. 2561576
Patent Literature 3: Japanese Examined Patent Application Publication No. Hei-3-5973

SUMMARY OF INVENTION

Technical Problem

However, either of the forming device in which a foam plate is not contacted with a double conveyor and a drying-dedicated zone is installed in a heating oven, and the forming device in which a drying-dedicated oven is disposed behind a double conveyor comes to be long and large sized, and has a problem of largely changing layouts and increasing facility investment costs. In the case of obtaining a foam plate at a high production rate, since the exposure time of the foam article in a heating oven becomes short, the curing becomes insufficient and there arises a problem of a decrease in the compression strength. For these reasons, the manufacture of a forming device for obtaining a good product of a thermosetting resin foam plate at a high rate and efficiently without any additional devices has been believed to be difficult so far.

In a manufacturing method of multilayering a moisture permeation-dedicated surface material other than a surface material, since an exfoliation process after the formation is essential and an air-permeable sheet cannot bear the repeated use, the method cannot be said to be a suitable method in view of the efficiency and costs.

Further since the double conveyor surface of a conventional forming device has no moisture permeability, water vapor, a foaming gas and the like in a thermosetting resin composition dissipate only from edges of a thermosetting foam plate, and thus a problem of the forming device is being unable to efficiently carry out the formation.

An object of the present invention is to provide a device for forming a thermosetting resin foam plate, the device being capable of drying at a high speed and of manufacturing the thermosetting resin foam plate more efficiently and stably without multilayering any unnecessary surface material, and a method of efficiently manufacturing a thermosetting resin foam plate therefor.

Solution to Problem

Then, as a result of exhaustive studies for the purpose of providing a forming device more efficiently manufacturing a thermosetting resin foam plate without multilayering any unnecessary surface material, and a higher-speed manufacturing method thereof than conventional methods, the present inventors have found that use of a double conveyor-type forming device in which apertures are formed on the surface of conveyors in a specific proportion can solve the above-mentioned problems, and this finding has led to the completion of the present invention.

That is, with respect to the forming device of a thermosetting resin foam plate according to the present invention, in a double conveyor-type forming device of a thermosetting resin foam plate, the device forming the thermosetting resin foam plate, the surface of traveling conveyors has apertures, and the aperture area ratio of the apertures is 15% or more and 80% or less.

The manufacturing method of a thermosetting resin foam plate according to the present invention comprises: mixing a resin composition composed of at least a thermosetting resin, a foaming agent and a curing agent in a mixer; continuously discharging the resin composition on a traveling air-permeable and flexible surface material, and covering the upper surface of the resin composition with an air-permeable and flexible surface material; and passing the covered resin composition through the forming device of a thermosetting resin foam plate according to claim 1 to form and cure the resin composition to manufacture the thermosetting resin foam plate.

According to the forming device of a thermosetting resin foam plate and the manufacturing method of a thermosetting resin foam plate according to the present invention, by forming a thermosetting resin composition by using a conveyor having apertures having an aperture area ratio of 15% or more and 80% or less, while the thermosetting resin composition is formed and cured on the conveyor, water vapor and a foaming gas in the thermosetting resin composition can be effectively released from the apertures. Therefore, the thermosetting resin foam plate is allowed to be dried at a high speed and manufactured more efficiently and stably without being multilayered with any unnecessary surface material.

In the forming device of a thermosetting resin foam plate according to the present invention, the apertures are preferably formed by forming through-holes in the conveyor. Thereby, apertures can easily be formed in the conveyor.

In the manufacturing method of a thermosetting resin foam plate according to the present invention, the thermosetting resin contains preferably any one or more of at least a phenolic resin, a urethane resin and an isocyanurate resin.

In the manufacturing method of a thermosetting resin foam plate according to the present invention, the phenolic resin is preferably a modified phenolic resin containing any one or more of at least urea, melamine and dicyandiamide.

In the manufacturing method of a thermosetting resin foam plate according to the present invention, the air-permeable and flexible surface material is preferably a nonwoven fabric comprising at least one of polyester, nylon and polypropylene, woven fabric, glass fiber nonwoven fabric, metal-deposited nonwoven fabric, calcium carbonate paper, aluminum hydroxide paper, magnesium silicate paper, perforated metal foil or perforated metal foil multilayer sheet.

In the manufacturing method of a thermosetting resin foam plate according to the present invention, the perforated metal foil preferably contains one or more of at least a copper foil and an aluminum copper foil.

In the manufacturing method of a thermosetting resin foam plate according to the present invention, the perforated metal foil multilayer sheet is preferably a composite of a perforated metal foil with a woven fabric, knitted fabric, knitted and woven fabric, or nonwoven fabric comprising any one of a polyester fiber, vinylon fiber, polypropylene fiber, polyamide fiber, glass fiber, carbon fiber and silicon carbide fiber, or with kraft paper.

In the manufacturing method of a thermosetting resin foam plate according to the present invention, the basis weight of the nonwoven fabric is preferably 15 $g/m^2$ or more and 80 $g/m^2$ or less.

Advantageous Effects of Invention

According to the present invention, a thermosetting resin foam plate can be dried at a high speed and manufactured more efficiently and stably without being multilayered with any unnecessary surface material.

BRIEF DESCRIPTION OF DRAWINGS

FIG. 5 is a cross-sectional diagram along V-V in FIG. 3.

DESCRIPTION OF EMBODIMENTS

Hereinafter, a forming device of a thermosetting resin foam plate and a manufacturing method of a thermosetting resin foam plate by using the forming device according to a preferred embodiment of the present invention will be described in detail by way of drawings.

Figure 1:
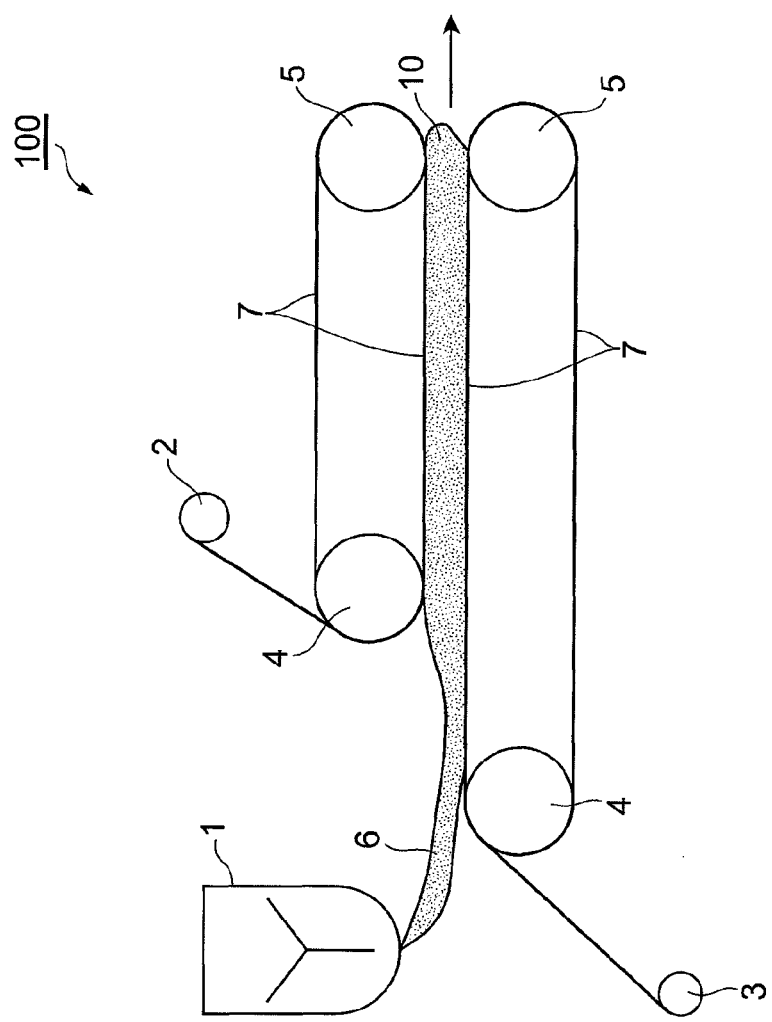
FIG. 1 is a schematic constitution diagram showing a constitution of a manufacturing device equipped with the forming device of a thermosetting resin foam plate according to an embodiment of the present invention.

FIG. 1 is a schematic constitution diagram showing a constitution of a manufacturing device equipped with the forming device 100 of a thermosetting resin foam plate according to an embodiment of the present invention. As shown in FIG. 1, the manufacturing device is constituted of a mixer 1 to mix a resin composition, and a forming device 100 to form a thermosetting resin foam plate.

The forming device 100 is a double conveyor-type forming device, and can adopt, for example, a slat-type double conveyor or an endless steel belt double conveyor. In the example shown in FIG. 1, a slat-type conveyor is drawn. As shown in FIG. 1, the forming device 100 is constituted by arranging conveyors 7 supported so as to be capable of traveling by conveyor drive units 4 and conveyor driven units 5 on the upper side and the lower side, so that contact surfaces contacting with a thermosetting resin foam plate (through surface materials) face each other during the formation of the thermosetting resin foam plate. The conveyors 7 are transporting belts wound on the conveyor drive units 4 and the conveyor driven units 5. In the conveyor 7 of the lower side, a portion thereof traveling between the upper end part of the conveyor drive unit 4 of the lower side and the upper end part of the conveyor driven unit 5 of the lower side constitutes a portion for transporting an object, and the upper surface of the portion constitutes a contact surface with the thermosetting resin foam plate. In the conveyor 7 of the upper side, a portion thereof traveling between the lower end part of the conveyor drive unit 4 of the upper side and the lower end part of the conveyor driven unit 5 of the upper side constitutes a portion for transporting the object, and the lower surface of the portion constitutes a contact surface with the thermosetting resin foam plate. An air-permeable surface material 2 is fed between the conveyor 7 of the upper side and the thermosetting resin foam plate 10, and an air-permeable surface material 3 is fed between the conveyor 7 of the lower side and the thermosetting resin foam plate 10. The forming device 100 can form the thermosetting resin foam plate 10 by holding a resin composition 6 fed from the mixer 1 between the conveyor 7 of the upper side and the conveyor 7 of the lower side through the surface materials 2, 3, and at the same time driving the conveyor drive unit 4 of the upper side and the conveyor drive unit 4 of the lower side in different directions from each other to transport the resin composition 6 under heating.

Figure 2:
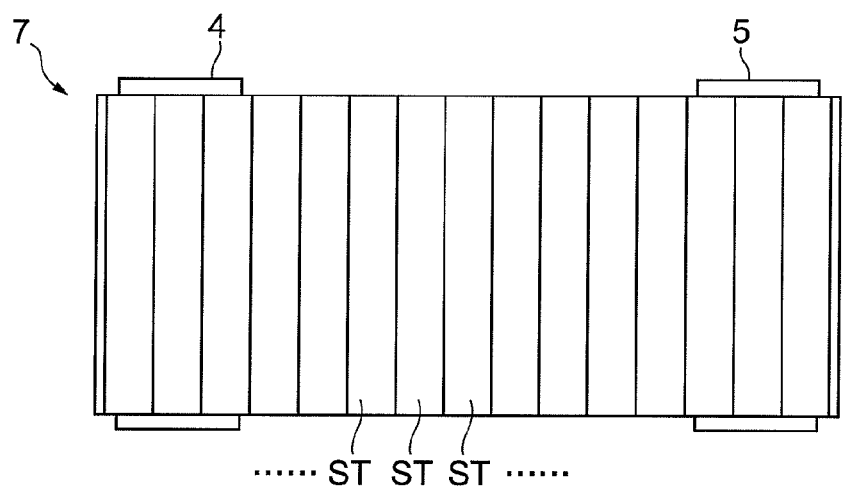
FIG. 2 is a diagram of a conveyor viewed from the thickness direction.
Figure 3:
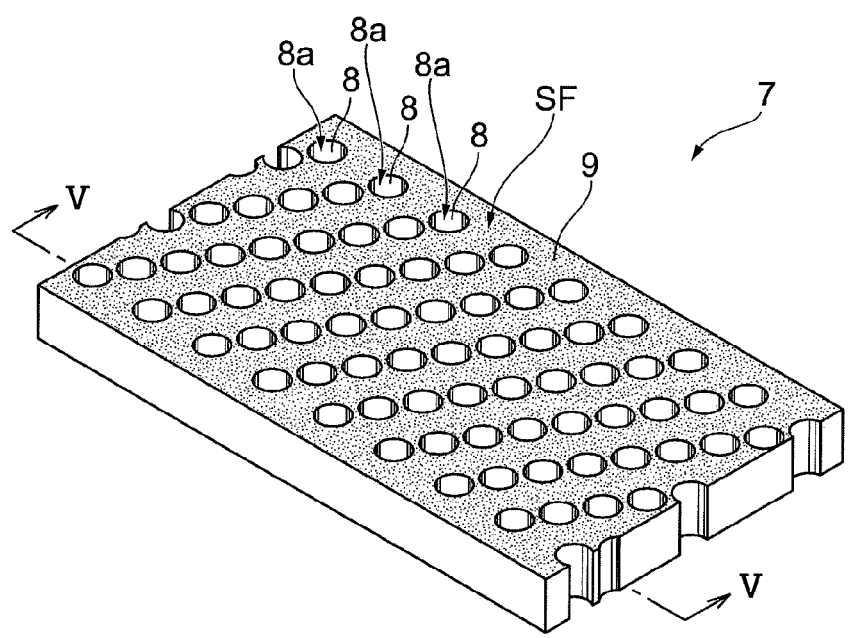
FIG. 3 is a perspective diagram showing a part of a conveyor.
Figure 4:
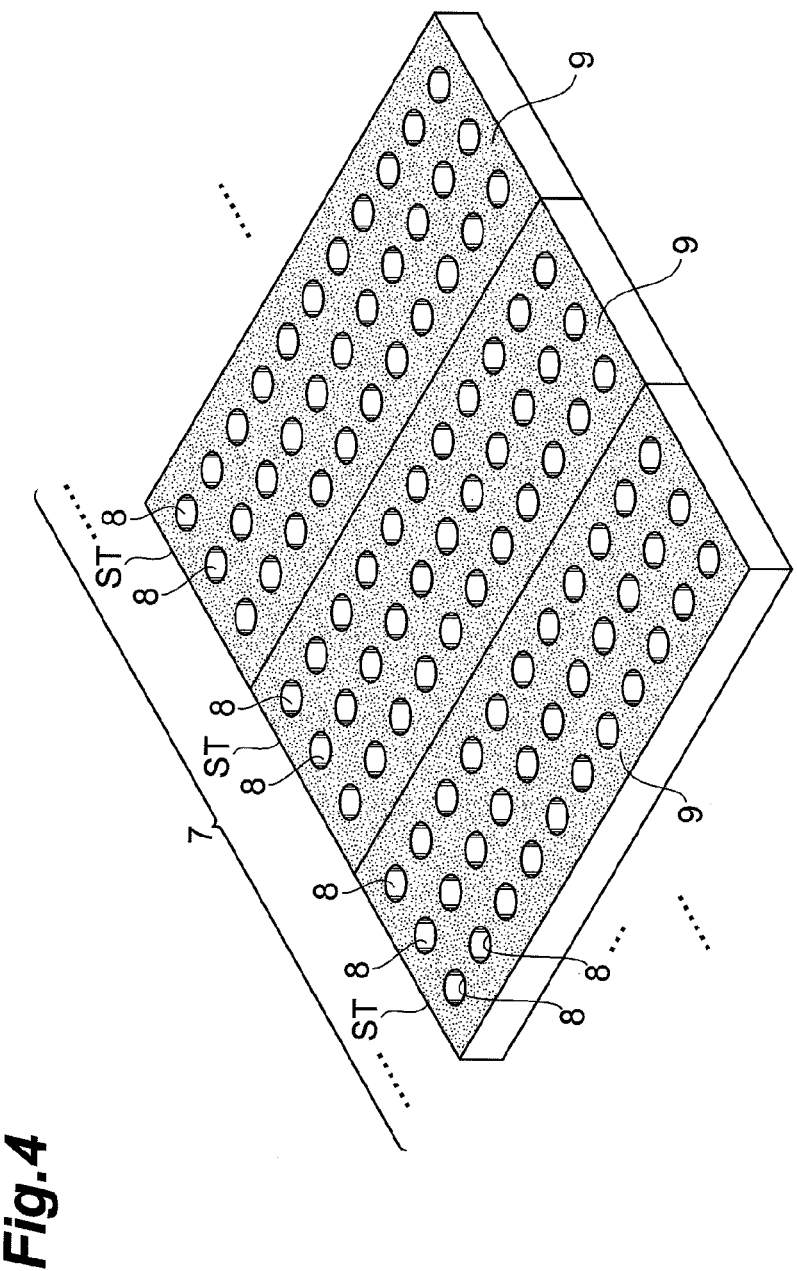
FIG. 4 is a perspective diagram showing an example of a constitution of a conveyor in the case of a slat-type conveyor.

In the case of a slat-type conveyor, a conveyor 7 is, as shown in FIG. 2, a unified conveyor formed by linking adjacently a plurality of slats ST. As shown in FIG. 3, in the conveyor 7, through-holes 8 penetrating in the thickness direction are formed to thereby form apertures 8a on the surface SF containing a contact surface 9 contacting with a thermosetting resin foam plate 10. FIG. 3 is a diagram plainly showing a characteristic structure of the present invention as an overall shape of a part of the conveyor 7. The shape and thickness of the conveyor 7, and the arrangement, number and size of the through-holes 8 are not limited to those shown in FIG. 3. The shape and the like can be set optimally in conformance with a forming device to be adopted. In the case of a slat-type conveyor, a conveyor 7 can be constituted, for example, as shown in FIG. 4. As shown in FIG. 4, the conveyor 7 is constituted by linking adjacently a plurality of slats ST in which a plurality of through-holes 8 are formed. Specifically, for example, the plurality of slats ST may be connected to a chain to move the slats ST, or the slats may be directly linked with couplings. Here, a "surface" of a conveyor in claims is defined as "a virtual plane surface containing a contact surface contacting with a thermosetting resin foam plate during the formation of the thermosetting resin foam plate on the conveyor"; and an "aperture" is defined as "a region becoming contactless with a thermosetting resin foam plate during the formation on a surface of a conveyor, and a portion open to the outside of the conveyor in a region except the surface of the conveyor".

Specifically, in the case where apertures 8a are formed by forming through-holes 8, as shown in FIG. 5(a), the surface SF being a virtual surface containing a contact surface 9 contacting with a thermosetting resin foam plate 10 corresponds to a "surface" in claim. The aperture 8a which is formed by the upper end of a through-hole 8 and is a region becoming contactless with the thermosetting resin foam plate on the surface SF of a conveyor 7 corresponds to an "aperture" in claim. The aperture 8a is open to the outside of the conveyor 7 in a surface 7a of the conveyor 7 except the surface SF through the internal space of the through-hole 8.

The shape of the through-hole 8 does not matter as long as the through-hole 8 penetrates to the surface 7a of the conveyor 7, and may be, for example, a tapered through-hole as shown in FIG. 5(b), or may be further other shapes. The shape of the aperture 8a may be a circular, elliptical, oval or another shape, but is preferably a circular shape of 1 mm or more and 10 mm or less in diameter, and more preferably a circular shape of 5 mm or more and 8 mm or less in diameter, from the viewpoint of the easiness of work of a metal making the aperture. Provided that even if a hole is opened on the surface SF of a conveyor 7, if the hole is a bottomed hole which does not penetrate to the surface 7a, and is nor open to the outside of the conveyor 7 either in other portions of the conveyor 7, the hole does not correspond to an "aperture" in the present invention.

Figure 6:
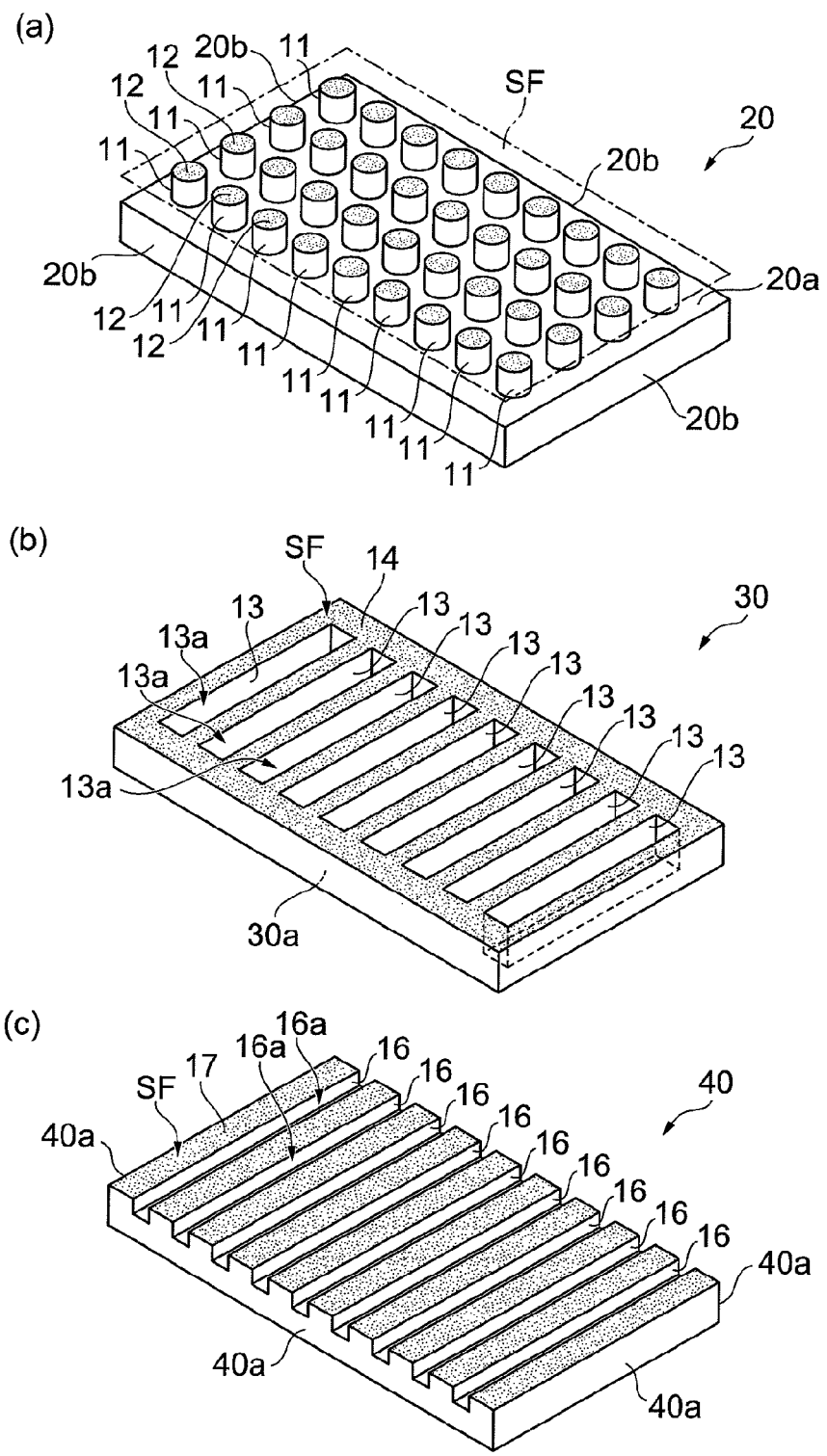
FIG. 6 is a perspective diagram showing an example of a conveyor.

Apertures of a conveyor may not be formed of a circular through-hole. For example, as shown in FIG. 6(a), the apertures may be formed by forming cylindrical protrusions 11 protruding upward from the upper surface 20a of a conveyor 20. In the conveyor 20 shown in FIG. 6(a), the surface SF being a virtual plane surface containing contact surfaces 12 of upper ends of the protrusions 11 as surfaces contacting with a thermosetting resin foam plate 10 corresponds to a "surface" in claim. A region becoming contactless with the thermosetting resin foam plate 10 on the surface SF, that is, a region where the protrusions 11 are not installed, corresponds to an "aperture" in claim. The aperture, that is, a region except the contact surfaces 12 of the protrusions 12 in the surface SF, is opened to the outside of the conveyor 20 through regions of the conveyor 20 except the surface SF of the conveyor 20, that is, spaces between the protrusions 11. FIG. 6(a) is a schematic diagram plainly showing a characteristic structure of the present invention as an overall shape of a part of the conveyor 20. The shape and thickness of the conveyor 20, and the arrangement, number and size of the protrusions 11 are not limited to those shown in FIG. 6(a). The shape and the like can be set optimally in conformance with a forming device to be adopted.

Apertures may be formed by forming rectangular slits 13 penetrating in the thickness direction of a conveyor 30 as shown in FIG. 6(b). In the conveyor 30 shown in FIG. 6(b), the surface SF being a virtual plane surface containing a contact surface 14 contacting with a thermosetting resin foam plate 10 corresponds to a "surface" in claim. The aperture 13a formed on the upper ends of the slit 13 and being a region becoming contactless with the thermosetting resin foam plate 10 on the surface SF of the conveyor 30 corresponds to an "aperture" in claim. The aperture 13a is opened to the outside of the conveyor 30 in a surface 30a of the conveyor 30 as a region except the surface SF through an internal space of the slit 13. FIG. 6(b) is a schematic diagram plainly showing a characteristic structure of the present invention as an overall shape of a part of the conveyor 30; and the shape and thickness of the conveyor 30, and the arrangement, number and size of the slits 13 are not limited to those shown in FIG. 6(b). The shape and the like can be set optimally in conformance with a forming device to be adopted.

Apertures may be formed by forming slits 16 extending across the whole region in the width direction of a conveyor 40 as shown in FIG. 6(c). In the conveyor 40 shown in FIG. 6(c), the surface SF being a virtual plane surface containing contact surfaces 17 contacting with a thermosetting resin foam plate 10 corresponds to a "surface" in claim. The aperture 16a formed on the upper end of the slit 13 and being a region becoming contactless with the thermosetting resin foam plate 10 on the surface SF of the conveyor 40 corresponds to an "aperture" in claim. The aperture 16a is opened to the outside of the conveyor 40 in side surfaces 40a as a region of the conveyor 40 except the surface SF through an internal space of the slit 16. FIG. 6(c) is a schematic diagram plainly showing a characteristic structure of the present invention as an overall shape of a part of the conveyor 40; and the shape and thickness of the conveyor 40, and the arrangement, number and size of the slits 16 are not limited to those shown in FIG. 6(c). The shape and the like can be set optimally in conformance with a forming device to be adopted.

The aperture area ratio of the apertures of a conveyor is set at 15% or more and 80% or less. The lower limit of the aperture area ratio is preferably 20% or more, and more preferably 25% or more, from the viewpoint of securing the compression strength of a thermosetting resin foam plate obtained by using the present device, and from the viewpoint of shortening the formation time, and is especially preferably 30% or more from the viewpoint of the dimensional stability due to the residual moisture percentage. The upper limit of the aperture area ratio is preferably 75% or less, more preferably 70% or less, and especially preferably 65% or less, from the viewpoint of the easiness and economic efficiency in manufacture of the present device.

Figure 7:
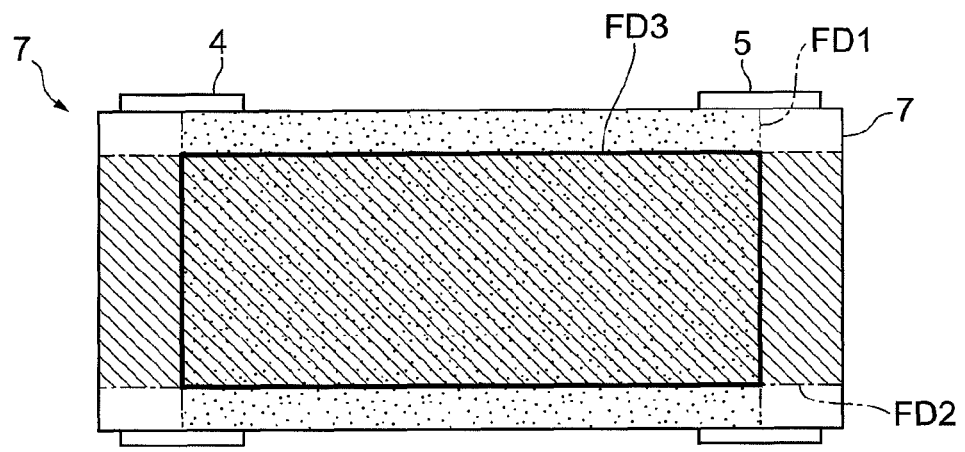
FIG. 7 is a diagram of a conveyor viewed from above.

The aperture area ratio of the apertures is a ratio of the total area of the apertures to the total area of a foam plate-forming section of the conveyor surface, and represented by the expression (1). Here, the foam plate-forming section of the conveyor surface is a region facing a thermosetting resin foam plate 10 out of the conveyor surface, and as shown in FIG. 7, is a region FD3 where a region FD1 (in figure, a region shown in satin finish) where the parallelism of conveyors 7 oppositely arranged is held and a region FD2 (in figure, a region shown in diagonal lines) where the thermosetting resin foam plate 10 passes are overlapped, in the conveyor 7. The total area of the foam plate-forming section of the conveyor surface is a sum of the total area of the apertures in the foam plate-forming section of the conveyor surface and the total area of the contact area with the thermosetting resin foam plate 10 in the foam plate-forming section of the conveyor surface.

Aperture area ratio={(the total area of the apertures in a foam plate-forming section of the conveyor surface)/(the total area of the foam plate-forming section of the conveyor surface)}×100[%]   Expression (1)

In the present invention, the forming temperature during foaming and curing is preferably 50° C. or higher and 120° C. or lower. If the temperature is lower than 50° C., the production rate becomes low, which is not preferable; and if the temperature exceeds 120° C., since the generated heat amount inside a foam becomes large to raise the temperature too much, bubble films of a thermosetting resin foam plate become easily broken, which is not preferable.

In the present invention, a thermosetting resin foam plate 10 is a foam plate composed of a thermosetting resin such as a phenolic resin foam, a urethane foam or an isocyanurate, and is obtained by foaming and curing a resin composition 6 in which a foaming agent and a curing agent are added in suitable amounts to a thermosetting resin. To the resin composition 6, as required, a surfactant, a plasticizer, an extender and the like may be added.

Thermosetting resins suitable for a forming device 100 having apertures on the conveyor surface as in the present invention are ones dissipating volatile materials such as a foaming agent during the formation, and include such as polyurethane resins, isocyanurate resins and phenolic resins. Above all, for phenolic resins, since dissipating a foaming agent during the foaming and formation, and additionally generating condensed water, the use of the present double conveyor-type forming device is suitable. The phenolic resin is a modified phenolic resin containing any one or more of at least urea, melamine and dicyandiamide.

The foaming agent used in manufacture of a phenolic resin foam plate is preferably a hydrocarbon and a chlorinated hydrocarbon. The foaming agent specifically includes such as normal butane, isobutane, cyclobutane, normal pentane, isopentane, cyclopentane, neopentane, normal hexane, isohexane, 2,2-dimethylbutane, 2,3-dimethylbutane, cyclohexane, monochloromethyl, monochloroethyl, 1-chloropropane and 2-chloropropane. Among these, pentanes of normal pentane, isopentane, cyclopentane and neopentane, and butanes of normal butane, isobutane and cyclobutane are especially preferable because these are good in foaming properties in manufacture of the phenolic resin foam of the present invention, and additionally have a relatively low thermal conductivity. Furthermore, pentanes of normal pentane, isopentane, cyclopentane and neopentane, and butanes of normal butane, isobutane and cyclobutane are particularly preferable because these have a low a global warming potential.

Surface materials 2, 3 used in the present invention are preferably air-permeable and flexible surface materials, and synthetic fiber nonwoven fabrics, glass fiber papers and papers are suitable especially from the viewpoint of the handleability as a foam plate and the economic efficiency. More specifically are a nonwoven fabric comprising at least one of polyester, nylon and polypropylene, woven fabric, glass fiber nonwoven fabric, metal-deposited nonwoven fabric, calcium carbonate paper, aluminum hydroxide paper, magnesium silicate paper, perforated metal foil or perforated metal foil multilayer sheet. The perforated metal foil multilayer sheet is preferably a composite of a perforated metal foil with a woven fabric, knitted fabric, knitted and woven fabric, nonwoven fabric comprising any one of a polyester fiber, vinylon fiber, polypropylene fiber, polyamide fiber, glass fiber, carbon fiber and silicon carbide fiber, or with kraft paper. In a common manufacturing method of a thermosetting resin foam plate, a resin composition is discharged on a traveling lower surface material, and a surface material is then covered thereon to obtain a laminate of a thermosetting resin foam plate equipped with the surface materials as both surface layers. The perforated metal foil preferably contains one or more of at least a copper foil and an aluminum copper foil. The basis weight of the nonwoven fabric is preferably 15 g/m$^2$ or more and 80 g/m$^2$ or less. If the basis weight is less than 15 g/m$^2$, since the thermosetting resin is oozed in the surface materials during the foaming, not only the surface quality is greatly damaged, but also the mold releasability from a conveyor right after the formation by the double conveyor decreases to thereby bring about a risk of damaging the thermosetting resin foam plate. This is also because in the case where the basis weight exceeds 80 g/m$^2$, the thermosetting resin does not sufficiently contact with the surface materials, and right after the formation, the surface materials have a risk of exfoliating from the thermosetting resin foam plate. Preheating the surface materials promotes the curing of the thermosetting resin and raises the viscosity to thereby reduce the oozing out, thereby allowing use of a nonwoven fabric having even a basis weight of 10 g/m$^2$ or more. The basis weight refers to a weight per unit area.

Then, a manufacturing method of a thermosetting resin foam plate by using the above-mentioned forming device 100 will be described. First, a resin composition composed of a thermosetting resin, a foaming agent and a curing agent is mixed in a mixer 1; the resin composition 6 is continuously discharged on a surface material 3 fed on a lower-side conveyor 7 and traveling, and at the same time, the upper surface of the resin composition 6 is covered with a surface material 2 fed on the lower side of an upper-side conveyor 7 and traveling; and the covered resin composition is held between the upper and lower conveyors 7 of the forming device 100, and passed therethrough under heating to form and cure the resin composition 6, thus manufacturing the thermosetting resin foam plate 10.

As described above, according to the forming device 100 and the manufacturing method of a thermosetting resin foam plate according to the embodiment of the present invention, by the formation using conveyors 7 having apertures having an aperture area ratio of 15% or more and 80% or less, water vapor and a foaming gas in the thermosetting resin composition can be effectively released from the apertures while the formation and curing are being carried out in the conveyors 7. Therefore, the drying at a high speed can be carried out and the thermosetting resin foam plate 10 can be manufactured more efficiently and stably, without being multilayered with any unnecessary surface material.

EXAMPLES

Then, the present invention will be described in more detail by way of Examples and Comparative Examples, but the scope of the present invention is not limited thereto. Hereinafter, a phenolic resin is taken up for description as an example of a thermosetting resin.

<Synthesis of a Phenolic Resin>

3,500 kg of a 52-wt % formaldehyde and 2,510 kg of a 99-wt % phenol were charged in a reactor, and stirred by a propeller revolution-type stirrer; and the liquid temperature in the reactor is regulated at 40° C. by a thermoregulator. Then, while a 50-wt % sodium hydroxide aqueous solution was being added, the solution was heated to carry out the reaction. At the stage where the Ostwald viscosity reached 60 centistokes (=60×10$^{-6}$ m$^2$/s, the measurement value at 25° C.), the reaction liquid is cooled, and 570 kg of urea (equivalent to 15 mol % of the amount of formaldehyde charged) was added. Thereafter, the reaction liquid was cooled to 30° C., and the pH thereof was neutralized at 6.4 with a 50-wt % aqueous solution of para-toluenesulfonic acid hydrate.

The reaction liquid was subjected to a dehydration treatment at 60° C., and the viscosity at 40° C. was measured and was 5,800 mPa·s. The resultant was named a phenolic resin A-U.

Example 1

A block copolymer of ethylene oxide-propylene oxide (Pluronic F-127, made by BASF AG) as a surfactant was mixed in a proportion of 2.0 parts by weight with 100 parts by weight of the phenolic resin A-U. A composition composed of 7 parts by weight of a mixture of 50% by weight of isopentane and 50% by weight of isobutane as foaming agents and 11 parts by weight of a mixture of 80% by weight of xylenesulfonic acid and 20% by weight of diethylene glycol as acid curing catalysts with respect to 100 parts by weight of the phenolic resin was fed in a mixer whose temperature was regulated at 25° C. so that the resin flow volume after the mixing became 52 kg/hr; and the resin composition was then discharged from the mixer, and fed on a moving lower surface material.

As the surface material, a polyester nonwoven fabric ("Spunbond E05030", basis weight: 30 g/m$^2$, thickness: 0.15 mm, made by Asahi Kasei Fibers Corp.) was used.

After the resin composition fed on the lower surface material was covered with an upper surface material, the covered resin composition was fed to a slat-type double conveyor whose atmosphere temperature was set at 80° C. and which had apertures having an aperture area ratio of 65% in the upper and lower conveyors so as to be held between the upper and lower surface materials to cure the resin composition in a residence time of 30 min; and thereafter, the resin composition was post-cure heated in an oven at 105° C. for 2 hours to obtain a foam plate. The evaluation of the foam plate was carried out for foam plates obtained right after the foam plate had passed through the double conveyor forming device and after the post-curing treatment, respectively.

Example 2

A foam plate was obtained as in Example 1, except for altering the aperture area ratio to 50%.

Example 3

A foam plate was obtained as in Example 1, except for altering the aperture area ratio to 30%.

Example 4

A foam plate was obtained as in Example 1, except for altering the aperture area ratio to 20%.

Example 5

A foam plate was obtained as in Example 3, except for altering the basis weight of the surface material to 70 g/m$^2$.

Example 6

A foam plate was obtained as in Example 4, except for altering the basis weight of the surface material to 70 g/m$^2$.

Comparative Example 1

A foam plate was obtained as in Example 1, except for altering the aperture area ratio to 10%.

Comparative Example 2

A foam plate was obtained as in Comparative Example 1, except for altering the forming time to 60 min.

Comparative Example 3

A foam plate was obtained as in Comparative Example 1, except for altering the aperture area ratio to 4% and the forming time to 90 min.

Comparative Example 4

A foam plate was obtained as in Comparative Example 1, except for altering the aperture area ratio to 0% and the forming time to 90 min.

Comparative Example 5

A foam plate was obtained as in Example 1, except for altering the aperture area ratio to 14%.

Comparative Example 6

A foam plate was obtained as in Example 1, except for altering the basis weight of the surface material to 70 g/m$^2$ and the aperture area ratio to 14%.

The properties of the resin composition in the present invention and evaluation methods of the obtained foam plates will be described.

[Moisture Percentage of a Foam Plate]

The moisture percentage of a foam plate was a value, as measured and determined as a moisture percentage by using a 20 cm-square foam plate as a sample, acquired by dividing a value acquired by subtracting a sample weight after the post-cure heating from a sample weight right after the formation by the sample weight after the post-cure heating.

[Density of a Foam Plate]

The density of a foam plate was a value determined by using a 20 cm-square foam plate as a sample, removing the surface materials of the sample and measuring the weight and the apparent volume, and was measured according to JIS-K-7222.

[Closed Cell Content of a Foam Plate]

A cylindrical sample of 35 mm to 36 mm in diameter was gouged out from a foam plate by a cork borer, cut into an even height of 30 mm to 40 mm, and thereafter measured for the sample volume by a standard usage of an air comparison-type gravity meter (made by Tokyo Science Co., Ltd., model: 1,000). The closed cell content was a value acquired by dividing a value acquired by subtracting a volume of bubble walls calculated from a sample weight and a resin density from the sample volume by an apparent volume calculated from an outer size of the sample, and was measured according to ASTM-D-2856. Here, in the case of a phenolic resin, the density thereof was set to be 1.3 kg/L.

[Measurement of the Compression Strength of a Foam Plate]

A foam plate was cut into 10 cm-square, and the compression strength was measured at a specified strain of 0.05 according to JIS-K7220.

[Overall Evaluation of a Foam Plate]

A foam plate exhibiting a moisture percentage of 1.0% or less and a compression strength of 14.0 N/cm$^2$ or more was defined as ◯; a foam plate satisfying either one of the conditions was defined as Δ; and a foam plate satisfying neither thereof was defined as X.

The aperture area ratios, forming temperatures and forming times among the forming conditions used in the above-mentioned Examples and Comparative Examples, and the evaluation results of the obtained foam plates are shown in Table 1.

TABLE 1

| | Surface Material | Forming Conditions | | | Evaluation of Products | | | | |
|---|---|---|---|---|---|---|---|---|---|
| | Basis Weight g/m² | Aperture Area Ratio % | Forming Temperature °C. | Forming Time min | Moisture Percentage % | Density Kg/m³ | Closed Cell Content % | Compression Strength N/cm² | Overall Evaluation |
| Example 1 | 30 | 65 | 80 | 30 | 0.2 | 31.3 | 93 | 18.4 | ○ |
| Example 2 | 30 | 50 | 80 | 30 | 0.2 | 31.9 | 93 | 21.5 | ○ |
| Example 3 | 30 | 30 | 80 | 30 | 0.4 | 31.1 | 94 | 20.2 | ○ |
| Example 4 | 30 | 20 | 80 | 30 | 0.5 | 29.3 | 93 | 19.3 | ○ |
| Example 5 | 70 | 30 | 80 | 30 | 0.5 | 31.9 | 95 | 19.7 | ○ |
| Example 6 | 70 | 20 | 80 | 30 | 0.8 | 31.6 | 96 | 20.6 | ○ |
| Comparative Example 1 | 30 | 10 | 80 | 30 | 4.0 | 28.0 | 92 | 9.8 | X |
| Comparative Example 2 | 30 | 10 | 80 | 60 | 2.4 | 27.5 | 92 | 12.7 | X |
| Comparative Example 3 | 30 | 4 | 80 | 90 | 3.4 | 26.3 | 93 | 10.7 | X |
| Comparative Example 4 | 30 | 0 | 80 | 90 | 3.4 | 27.8 | 92 | 10.8 | X |
| Comparative Example 5 | 30 | 14 | 80 | 30 | 1.1 | 26.9 | 92 | 16.8 | Δ |
| Comparative Example 6 | 70 | 14 | 80 | 30 | 1.5 | 30.9 | 95 | 18.0 | Δ |

As shown in Table 1, any of the foam plates according to Examples 1 to 6 exhibited a lower moisture percentage and a higher density, closed cell content and compression strength than the foam plates according to Comparative Examples 1 to 4, and the overall evaluation thereof was ○. In Comparative Examples 5 and 6, the moisture percentages exceeded 1.0%, and the overall evaluation of any of them was Δ.

INDUSTRIAL APPLICABILITY

The present invention can be utilized for the formation of a thermosetting resin foam plate.

REFERENCE SIGNS LIST

1 . . . MIXER, 2, 3 . . . SURFACE MATERIAL (FLEXIBLE SURFACE MATERIAL), 6 . . . RESIN COMPOSITION, 7, 20, 30, 40 . . . CONVEYOR, 8 . . . THROUGH-HOLE, 8a, 13a, 16a . . . APERTURE, SF . . . SURFACE, 10 . . . THERMOSETTING RESIN FOAM PLATE.

The invention claimed is:

1. A double conveyor device for forming a phenolic resin foam plate, comprising:
upper-side and lower-side conveyors for rolling a resin composition comprising at least a phenolic resin, a foaming agent and a curing agent, and forming the phenolic resin foam plate by conveying the resin composition while heating;
a resin composition feeding unit for feeding the resin composition comprising the phenolic resin between the upper-side and lower-side conveyors; and
surface material feeding units for feeding an air-permeable and flexible surface material between the upper-side conveyor and resin composition, and between the lower-side conveyor and the resin composition, respectively,
wherein surfaces of the upper-side and lower-side traveling conveyors have apertures, the aperture area ratio of the apertures being 20% or more and 80% or less.

2. The device for forming a phenolic resin foam plate according to claim 1, wherein the apertures are formed by forming through-holes in the conveyor.

3. A method of manufacturing a phenolic resin foam plate, comprising:
mixing a resin composition comprising at least a phenolic resin, a foaming agent and a curing agent in a mixer;
continuously discharging the resin composition on an air-permeable and flexible surface material, and covering an upper surface of the resin composition with an air-permeable and flexible surface material; and
passing the covered resin composition through the device for forming a phenolic resin foam plate according to claim 1 to form and cure the resin composition.

4. The method of manufacturing a phenolic resin foam plate according to claim 3, wherein the phenolic resin is a modified phenolic resin comprising any one or more of at least urea, melamine and dicyandiamide.

5. The method of manufacturing a phenolic resin foam plate according to claim 3, wherein the air-permeable and flexible surface material is a nonwoven fabric comprising at least one of polyester, nylon and polypropylene, a woven fabric, a glass fiber nonwoven fabric, a metal-deposited nonwoven fabric, a calcium carbonate paper, an aluminum hydroxide paper, a magnesium silicate paper, a perforated metal foil or a perforated metal foil multilayer sheet.

6. The method of manufacturing a phenolic resin foam plate according to claim 5, wherein the perforated metal foil comprises one or more of at least a copper foil and an aluminum copper foil.

7. The method of manufacturing a phenolic resin foam plate according to claim 5, wherein the perforated metal foil multilayer sheet is a composite of the perforated metal foil with a woven fabric, a knitted fabric, a knitted and woven fabric, or a nonwoven fabric comprising any one of a polyester fiber, a vinylon fiber, a polypropylene fiber, a polyamide fiber, a glass fiber, a carbon fiber and a silicon carbide fiber, or with a kraft paper.

8. The method of manufacturing a phenolic resin foam plate according to claim 5, wherein the nonwoven fabric has a basis weight of 15 g/m² or more and 80 g/m² or less.

* * * * *